United States Patent [19]

Mochizuki et al.

[11] Patent Number: 4,933,990
[45] Date of Patent: Jun. 12, 1990

[54] OPTICAL PRIVACY COMMUNICATION SYSTEM IN TWO-WAY OPTICAL TRANSMISSION SYSTEM

[75] Inventors: Kiyofumi Mochizuki, Hachioji; Hiroharu Wakabayashi, Kawasaki; Yoshinao Iwamoto, Wakayama, all of Japan

[73] Assignee: Kokusai Denshin Denwa Kabushiki Kaisha, Tokyo, Japan

[21] Appl. No.: 222,194

[22] Filed: Jul. 21, 1988

[30] Foreign Application Priority Data

Jul. 23, 1987 [JP] Japan .................................. 62-182245

[51] Int. Cl.⁵ .............................................. G02B 5/20
[52] U.S. Cl. ...................................... 455/602; 370/3; 350/96.16; 455/606
[58] Field of Search ............... 455/600, 601, 602, 606, 455/607, 610, 612; 370/1, 3; 350/96.16, 96.19

[56] References Cited

U.S. PATENT DOCUMENTS 4,641,371 2/1987 Shutterly .............................. 455/612
4,755,016 7/1988 DeLoach, Jr. et al. ............ 455/602

FOREIGN PATENT DOCUMENTS 0148436 9/1982 Japan .................................. 455/601

Primary Examiner—Benedict V. Safourek
Assistant Examiner—Christopher O. Edwards
Attorney, Agent, or Firm—Emmanuel J. Lobato; Robert E. Burns

[57] ABSTRACT

An optical privacy communication system in optical fiber communications between many points is disclosed in which, each station is provided with a privacy circuit. Each privacy circuit comprises a first optical branch for connecting the station to first and second optical branches, a second optical branch for connecting the first and second optical branches to the optical fiber transmission line, an optical isolator inserted in the first optical branch, for passing only a signal of a direction from the first optical branch to the second optical branch, and an optical filter inserted in the second optical branch, for passing only an optical signal of a frequency assigned to the station, so that an optical privacy communication is carried out between the stations.

4 Claims, 3 Drawing Sheets

OPTICAL PRIVACY COMMUNICATION SYSTEM IN TWO-WAY OPTICAL TRANSMISSION SYSTEM

BACKGROUND OF THE INVENTION

The present invention relates to an optical privacy communication system in a two-way optical transmission system in which a plurality of stations are branch-connected to an optical fiber transmission line.

Optical fiber communication systems now in use utilize, as a repeating system, an optical-to-electric-to-optical conversion system which involves once converting an optical signal into an electric signal, amplifying and waveform-shaping the electric signal, and driving again a semiconductor laser with the amplified electric signal.

On the other hand, there has been proposed, as a new repeating system, an optical amplification system which directly amplifies an optical signal. The repeating system utilizing the optical amplification is advantageous over the conventional optical-to-electric-to-optical conversion repeating system in that repeating circuits used are simplified and that wavelength multiplex signals or frequency multiplex signals of a desired transmission rate can be amplified collectively by one optical amplifier. Further, since the amplifier gain is fixed regardless of the direction of incidence of light, optical signals in two ways can be amplified together by one optical amplifier.

The optical amplification is performed chiefly by a method using a semiconductor laser [Electronics Letters, Vol. 21, pp. 1076–1077, 1985] and an optical fiber Raman amplification method utilizing a stimulated Raman scattering phenomenon which occurs in an optical fiber [Electronics Letters, Vol. 23, pp. 196–197, 1987]. Up to now results of many studies have been reported on amplification characteristics and noise characteristics of these optical amplification methods. It is now predicted theoretically that the direct optical amplification will provide a maximum amplifier gain in the range of 30 to 40 dB and permit an optical transmission over 10,000 km with no influence of a background light noise which is caused by spontaneous scattered light, and the practicality of this system as a future optical repeating system is becoming higher (IEEE. J. Lightwave Tech., Vol. LT-4, pp. 1328–1333 and IEEE. J. Quantum Electron, Vol. QE-17, pp. 919–935). When this optical repeating system is put into practical use, an optical cable having a repeater will be considered as a mere optical transmission line just like a non-repeating optical cable, and the combined use of this system and an optical branching technique will make possible a multi-point communication in which a frequency (or wavelength) is assigned to each section between the points.

In this instance, the privacy of communication is an important problem to which special attention should be paid. Especially in international communications there is an eager demand for a privacy characteristic from the political point of view.

SUMMARY OF THE INVENTION

An object of the present invention is to provide an optical privacy communication system in optical fiber communications between many points.

According to the optical privacy communication system of the present invention, in a two-way optical transmission system having a plurality of stations branch-connected to an optical fiber transmission line, each station is provided with a first optical branch for connecting the station to first and second optical branches, a second optical branch for connecting the first and second optical branches to the optical fiber transmission line, an optical isolator inserted in the first optical branch, for passing only a signal of a direction from the first optical branch to the second optical branch, and an optical filter inserted in the second optical branch, for passing only an optical signal of a frequency assigned to the station, whereby an optical privacy communication is carried out between the stations.

BRIEF DESCRIPTION OF THE DRAWINGS

The present invention will be described in detail below with reference to the accompanying drawings, in which.

DETAILED DESCRIPTION

Figure 1:
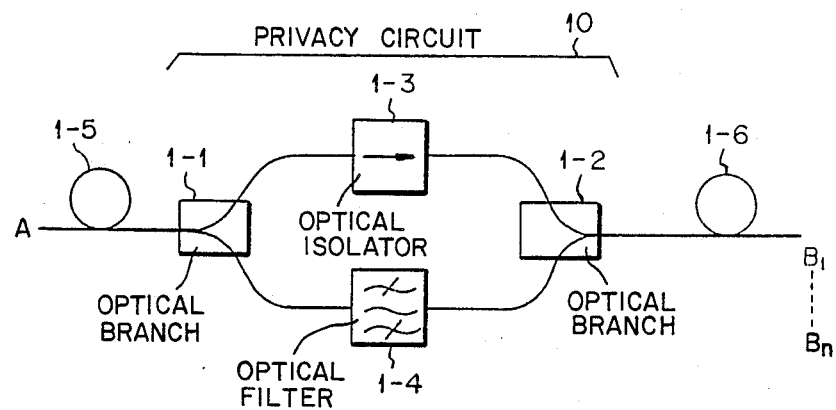
FIG. 1 is a block diagram illustrating the principal part of this invention system.

With reference to FIG. 1 illustrating an optical privacy communication system for two-way optical communications through one optical filter, an optical signal destined for n stations from a station A, which has propagated over an optical fiber 1-5 therefrom, is branched by an optical branch 1-1 such as an optical fiber coupler, into two signals. One of the signals is provided to an optical isolator 1-3 which permits the passage therethrough of only an optical signal destined for n stations $B_1$, $B_2$, ... and $B_n$ from the station A, and the other optical signal is applied to an optical filter 1-4 which suppresses the other optical signal while permitting the passage therethrough of only an optical signal destined for the station A from the n stations in the direction from an optical branch 1-2 to the optical branch 1-1.

The optical signal passage through the optical isolator 1-3 is applied through the optical branch 1-2 which is provided, which is provided to an optical fiber 1-6.

Figure 2:
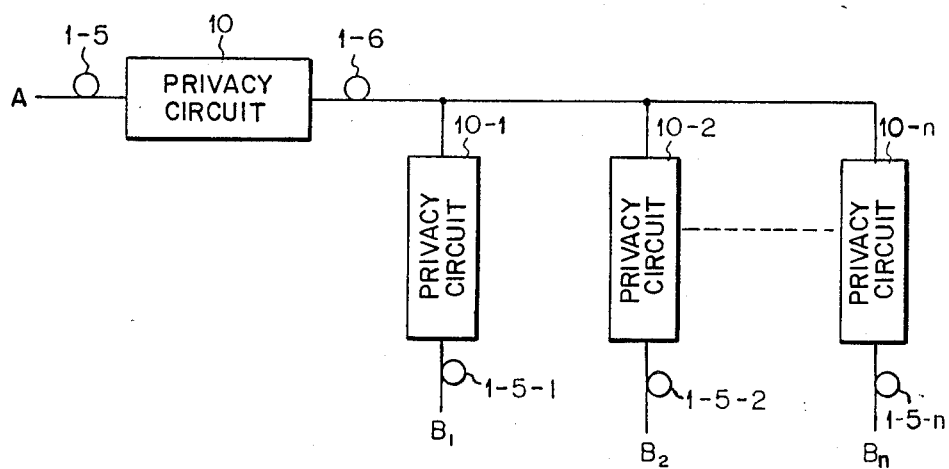
FIGS. 2 and 4 are block diagrams illustrating embodiments of the present invention.

In FIG. 1 a privacy circuit for the station A alone is shown, but privacy circuits 10-1, 10-2, ... and 10-n similar to the above-mentioned one 10 composed of the optical branch 1-2, the optical isolator 1-3, the optical filter 1-4 and the optical branch 1-1 as shown are provided for the stations $B_1$, $B_2$, ... and $B_n$, respectively, as shown in FIG. 2, the band-pass frequency of the optical filter 1-4 of each station being set to correspond to the signal band assigned thereto. With such an arrangement, each station can send out an optical signal to any of the other stations, but each station is allowed to receive only an optical signal destined therefor. This ensures the privacy of communication.

Figure 3:
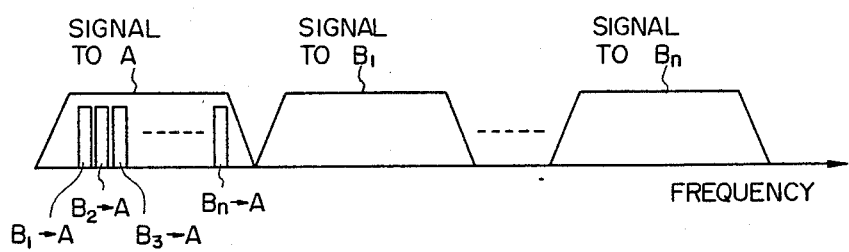
FIG. 3 is a diagram showing an example of the assignment of optical signal frequencies for use in the present invention.

The frequency of an optical signal which is assigned to each section between stations can be provided, for example, by such a method as depicted in FIG. 3. The frequency multiplex optical communication system shown can be achieved by use of a coherent communication system utilizing an optical heterodyne or optical homodyne detection technique. Further, the communication between the n stations can easily be implemented, for instance, by a method which employs an optical fiber coupler.

Figure 4:
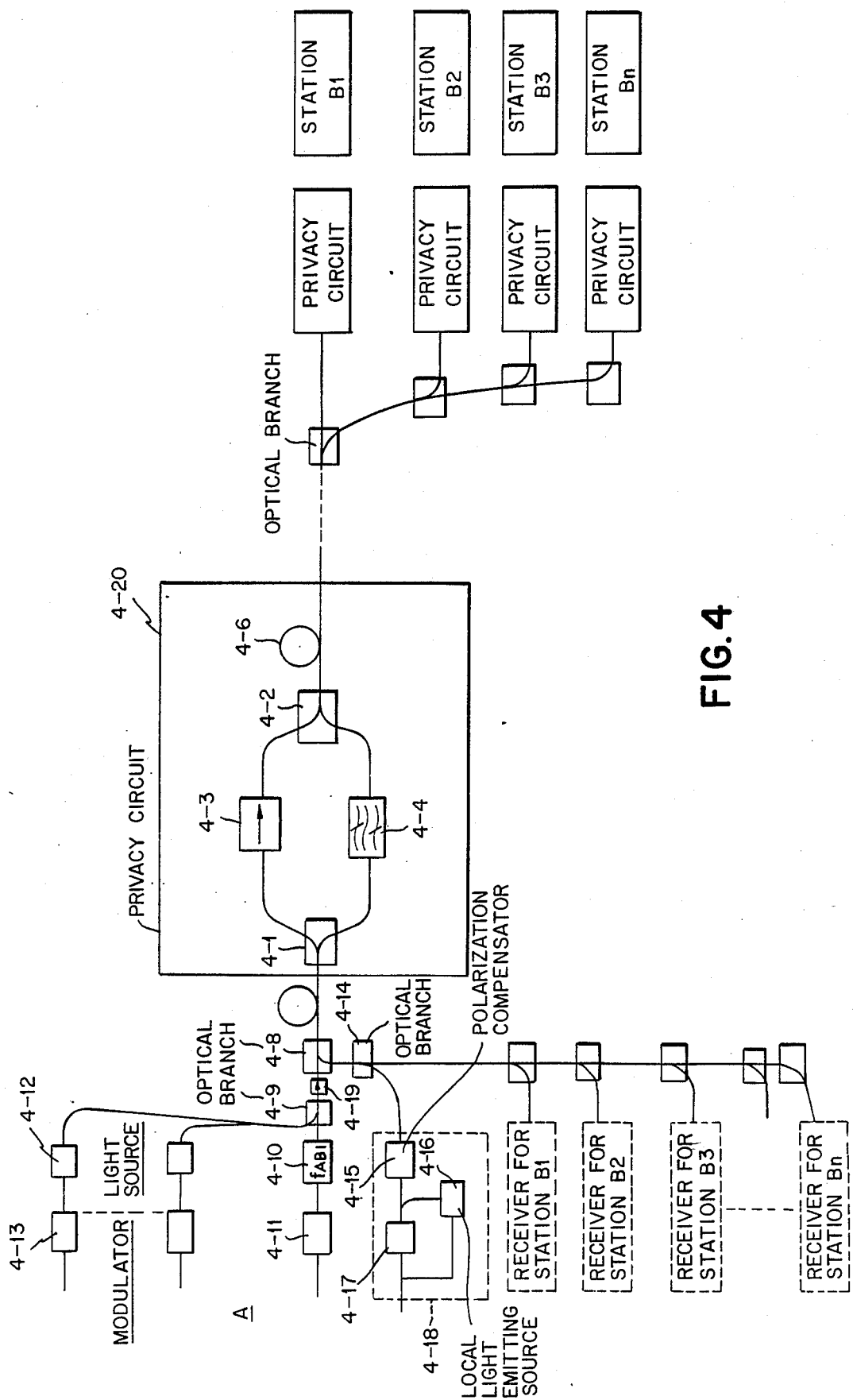

Turning next to FIG. 4, an example of the present invention will be described as being applied to a frequency division multiplex system employing the coherent optical communication system. Reference numeral 4-20 indicates the privacy circuit of the present invention, 4-1 and 4-2 optical branches, 4-3 an optical isolator, 4-4 an optical filter, and 4-6 an optical fiber. To coherent optical communication system is one that modulates the frequency or phase of light with a signal and permits the implementation of the frequency division multiplex communication system. This system uses a frequency $f_{AB1}$ as an optical frequency for communication from a station A to $B_1$ and a frequency $f_{B1A}$ as an optical frequency for communication from the station $B_1$ to A. Similarly, frequencies are predetermined for the sections between the other stations $B_2$ to $B_n$. A signal from the station A to $B_1$ is sent out from a light source 4-10 of the center frequency $f_{AB1}$ which is modulated by a modulator 4-11.

In a similar manner, signals to the other stations are lso sent out from light sources 4-12, . . . of predetermined center frequencies which are modulated by modulators 4-13, . . . , respectively. The optical signals thus sent out are coupled together by an optical branch 4-9 such as an optical fiber coupler, thereafter being transmitted via an optical isolator 4-19, an optical fiber 4-5 and the privacy circuit 4-20.

On the other hand, signals from the other stations to the station A arrive thereat via the optical filter 4-4 which permits the passage therethrough of only signals assigned to the station A. In the station A the optical signals are each guided by an optical branch 4-8 to a receiving section 4-18 ($B_1$ . . . $B_n$) for each of the other stations. In the coherent optical communication system it is desirable that signal light and locally emitting light agree in their polarized state, and the signal light is adjusted by a polarization compensator 4-15 so that its polarized state becomes the same as that of a local light emitting source 4-16. By tuning the center frequency of the local light emitting light source 4-16 to the center frequency $f_{B1A}$ of the signal light from the station $B_1$, the signal from the station $B_1$ can be obtained with a receiver 4-17. In the case of a semiconductor laser, the center frequency of its emitted light can be shifted by changing a current which is injected into the laser. The signals from the other stations to the station A are also demodulated in the same manner. Although in this example the polarization compensator 4-15 is provided for each station, it may also be disposed between the optical branches 4-15 and 4-8. The polarization compensation may be replaced with a compensation by a polarization diversity system.

Moreover, the isolator 4-19 may also be substituted by an optical filter which permits the passage therethrough of signal light which is transmitted from the station A alone.

As described above in detail, the present invention ensures the privacy of communications in the two-way optical transmission system through a simple circuit arrangement, and hence is of great utility in practical use.

What we claim is:

1. An optical privacy communication system in a two-way optical transmission system having a plurality of stations each branch-connected to an optical fiber transmission line, which comprises, in each station of the plurality of stations a privacy circuit comprising, a first optical branch for connecting the respective station to first and second optical branches, a second optical branch for connecting the first and second optical branches to the optical fiber transmission line, an optical isolator inserted in the first optical branch, for passing only an optical signal of a direction from the first optical branch to the second optical branch, and an optical filter inserted in the second optical branch, for passing only an optical signal of a frequency assigned to the station, and which is arranged to perform optical privacy communications between the station and the other stations.

2. An optical privacy communication system according to claim 1, in which said plurality of stations are each provided with an individual filter, to which an optical signal of one frequency selected from frequencies different from one another is individually assigned.

3. In a two-way optical transmission system having a plurality of stations each branch-connected to a two-way optical fiber transmission line, an optical privacy communication system comprising, for each station a privacy circuit, each privacy circuit comprising means defining two optical branched signals optical paths for independently transmitting a respective one of two branched optical signals, means defining a first optical branch for optically connecting the respective station to the two branched signals optical paths and for receiving an optical signal and branching it into said two branched signals, means defining a second optical branch for optically connecting the two optical branched signals optical paths to the optical transmission line and for receiving optical signals from the transmission line and branching the received optical signals from the transmission line into two optical branched signals, an optical isolator in one of the two optical paths for passing only an optical signal from the first optical branch to the second optical branch, an optical filter in a second of the two optical paths for passing only an optical signal of a frequency assigned to the station, whereby privacy in point-to-point optical communications between the respective station and other stations is effected.

4. A privacy circuit for use in each individual station of a two-way optical transmission system having a plurality of stations branch connected to a two-way optical transmission line comprising, means in the privacy circuit defining two optical paths for independently transmitting a respective one of two optical signals, means in the privacy circuit defining a first optical branch for optically connecting a respective station with the two optical paths of the privacy circuit and for receiving an optical signal for transmission and branching it into two signals applied to the two optical paths, means in the privacy circuit defining a second optical branch for optically connecting the two optical paths to the two-way optical transmission line for receiving optical signals transmitted through the optical transmission line from a plurality of other stations and for branching received optical signals from the optical transmission line, an isolator in one of the two optical paths of the privacy circuit for passing only an optical branched signal from the first optical branch to the second optical branch, an optical filter in a second of the two optical paths of the privacy circuit for passing only optical signals of a certain assigned frequency from the second optical branch to the first optical branch, whereby private point-to-poing optical communications among the stations connected to the optical transmission line is effected.

* * * * *